(12) United States Patent
Kobel et al.

(10) Patent No.: US 12,485,914 B2
(45) Date of Patent: Dec. 2, 2025

(54) DOOR MONITORING SYSTEM AND METHOD

(71) Applicant: Transportation IP Holdings, LLC, Norwalk, CT (US)

(72) Inventors: Karl J. Kobel, Wildwood, IL (US); Ikechi Olakunle Emelogu, Gurnee, IL (US); Afsar Ali, Buffalo Grove, IL (US); Naveenkumar Ramaiah, Bengaluru (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 267 days.

(21) Appl. No.: 18/150,347

(22) Filed: Jan. 5, 2023

(65) Prior Publication Data

US 2023/0278570 A1  Sep. 7, 2023

(30) Foreign Application Priority Data

Mar. 4, 2022  (IN) .............................. 202211011920

(51) Int. Cl.
  *B60W 50/12*  (2012.01)
  *B60W 40/08*  (2012.01)
  *E05F 1/00*  (2006.01)
  *G06V 20/58*  (2022.01)

(52) U.S. Cl.
  CPC ............ *B60W 50/12* (2013.01); *B60W 40/08* (2013.01); *E05F 1/002* (2013.01); *G06V 20/58* (2022.01)

(58) Field of Classification Search
  CPC ....... B60W 50/12; B60W 40/08; E05F 1/002; G06V 20/58
  See application file for complete search history.

(56) References Cited

U.S. PATENT DOCUMENTS

| | | | |
|---|---|---|---|
| 8,589,033 B2 | 11/2013 | Rafii et al. | |
| 2006/0037818 A1* | 2/2006 | Deplazes | G08B 13/19647 |
| | | | 187/316 |
| 2007/0008124 A1* | 1/2007 | Stadler | E05F 15/43 |
| | | | 340/545.1 |
| 2011/0109469 A1* | 5/2011 | Trim | G08B 21/22 |
| | | | 340/686.6 |
| 2014/0145824 A1* | 5/2014 | Chutorash | G07C 9/30 |
| | | | 340/5.71 |
| 2021/0268881 A1 | 9/2021 | Kobel et al. | |
| 2022/0185625 A1* | 6/2022 | One | B66B 1/3476 |

FOREIGN PATENT DOCUMENTS

WO  2016042168 A1  3/2016

OTHER PUBLICATIONS

Extended European Search Report mailed Aug. 7, 2023 for corresponding EP Application No. 23153182.3 (7 pages).

* cited by examiner

*Primary Examiner* — Seth A Silverman
(74) *Attorney, Agent, or Firm* — K&L Gates LLP (57) ABSTRACT

A door monitoring system may include an optical sensor that may generate sensor signals indicative of a field of view of the optical sensor. The field of view may include at least part of an interior vehicle floor in front of a vehicle door. The system also may include controller that receives the sensor signals and that detects a presence or absence of one or more persons and/or objects within the field of view of the optical sensor. The controller may change a speed at which the vehicle door moves based on the presence or the absence of the persons and/or objects that are detected responsive to detecting the presence or absence of the persons and/or objects.

19 Claims, 5 Drawing Sheets

DOOR MONITORING SYSTEM AND METHOD

CROSS-REFERENCE TO RELATED APPLICATIONS

This application claims priority to Indian Patent Application number 202211011920 (filed 4 Mar. 2022), the entire disclosure of which is incorporated herein by reference.

BACKGROUND

Technical Field

The subject matter described herein relates to systems and methods for controlling operation of vehicle doors.

State of Art

Many modern passenger vehicles and buildings have automated sliding or hinged doors for passengers to load and unload from the vehicle.

Automated doors may be operated by user initiated remote control, by a proximal user entry device (such as a keypad or card reader), or by a system that senses the presence or absence of a person or object (e.g., something other than a person) moving toward the door. Doors moving between an open and closed position have a path that must remain obstruction free for the door to function properly and to prevent damage to the door, the door frame, or any object or person in the path of the doors.

In an attempt to reduce likelihood of damage from contact between a moving vehicle door and an object, the United States federal government mandated Federal Motor Vehicle Safety Standard 118. (Other jurisdictions may have similar standards.) This standard calls for implementation of so-called anti-pinch devices that sense contact when an object is between a closing vehicle door and the associated vehicle door frame. Some anti-pinch devices are contact devices that require physical contact with an object and the vehicle door and/or door frame, whereas other anti-pinch devices are contactless, and do not require such contact.

Contact type anti-pinch devices try to mitigate damage after initial contact between an object and the vehicle door and/or door frame occurs. As soon as contact is detected, a control signal is generated causing the motor moving the door to halt or to reverse direction. Some contact sensors dispose a tube or trim within the relevant vehicle door frame region, and then sense at least one contact-caused parameter such as pressure, capacitance change, optical change, electrical current increase in the door drive motor, etc. The tube or trim may contain spaced-apart electrical wires that make contact only if an object depresses the tube or trim. In practice, such sensors are sometimes difficult to install, and can exhibit varying contact responses, especially as ambient temperature changes. But even if the best contact type anti-pinch device can only begin to function after some physical contact with an object has first occurred. Thus, a corrective command signal is not issued until initial contact occurs. In some instances, corrective action may come too late. For example, upon detecting contact there may be insufficient time to fully halt the closing action of a sliding door on a vehicle parked on a steep downhill incline. An object, which may be a person's hand, could be severely damaged before the closing inertia of the sliding door can be halted.

What is needed in the art is an improved system and method for detecting obstructions in the path of automatic doors and preventing contact between the door and the obstruction.

BRIEF SUMMARY

In one embodiment, a system (e.g., a monitoring system, such as a vehicle monitoring system or a door monitoring system) includes an optical sensor that may generate sensor signals indicative of a field of view of the optical sensor. The field of view may include at least part of an interior vehicle floor in front of a vehicle door. The system also may include controller that receives the sensor signals and that detects a presence or absence of one or more persons and/or objects within the field of view of the optical sensor. The controller may change a speed at which the vehicle door moves based on the presence or the absence of the persons and/or objects that are detected responsive to detecting the presence or absence of the persons and/or objects.

In another example, a method is provided that may include generating sensor signals indicative of a sensed presence or absence of one or more persons or objects within a field of view of an optical sensor. The field of view may include at least part of an interior vehicle floor in front of a vehicle door. The method also may include detecting the presence or absence of the one or more persons or objects within the field of view based on the sensor signals, and changing a speed at which the vehicle door moves responsive to detecting the presence or the absence of the one or more persons or objects.

In another example, a monitoring system may include an optical sensor that may generate sensor signals of a sensed field of view of the optical sensor. The system also may include a controller that receives the sensor signals from the optical sensor and one or more of (a) prevents a vehicle door from automatically opening or speed up closing of the vehicle door based on detecting an absence of one or more persons or objects within the field of view and/or (b) prevents the vehicle door from automatically opening based on detecting the presence of the one or more persons or objects abutting the vehicle door.

BRIEF DESCRIPTION OF THE DRAWINGS

The subject matter may be understood from reading the following description of non-limiting embodiments, with reference to the attached drawings, wherein below.

DETAILED DESCRIPTION

The subject matter described herein relates to monitoring systems and methods that detect and optionally count passengers or persons, and other objects in a door portal of a vehicle, building, or the like. While one or more embodiments are described herein in connection with passengers boarding and leaving a vehicle through the door portal, not all embodiments are limited to vehicles and passengers. One or more embodiments may be used in connection with doors of buildings. References to passengers is not intended to limit all embodiments to vehicles. Unless explicitly disclaimed or stated otherwise, a passenger may include a person entering or exiting a building through a door portal.

The system can include sensors having monitoring ranges or areas that include the entire doorway area (instead of just a portion of the area directly in front of the door), as well as a trailing edge area and exterior of the door (e.g., outside of the vehicle or building). The system can examine the sensor output to distinguish between passengers standing close to the door, passengers approaching the door, and passengers that are in the doorway portal (while the doors are open). Based on the sensor output, the system can implement one or more responsive actions, such as slowing movement of the door (e.g., slow the opening movement of the door and/or slow the closing movement of the door) and/or changing the direction of movement of the door (e.g., reverse the current opening movement of the door to closing movement or reverse the current closing movement of the door to opening movement of the door). The movement of the door can be controlled based on a measured, estimated, or sensed distance between the passenger and the door. For example, the speed at which the door closes can be slowed by greater amounts for passengers that are closer to the door than for passengers that are farther from the door. As another example, the speed at which the door opens can be increased for closer passengers than for farther passengers.

The sensor(s) can be optical sensors that output data such as images or video that are used to detect the presence (or absence) of persons or objects. The sensor(s) may not include any contact sensors that require physical touch to detect a person or object, and may not include sensors that do not output images or video. For example, the sensor(s) may not include infrared, LiDAR, sonar, or other types of sensors that may detect persons or objects based on time of flight, interruption of a light path, etc. Instead, the sensor(s) may include cameras or the like.

The monitoring system optionally can count the number of passengers and/or objects passing through the door portal. This information can be used by the monitoring system or another system to determine how many passengers and/or objects are onboard the vehicle or inside the building, and/or how many passengers and/or objects have left the vehicle and/or building. This information can be used for a variety of purposes, including tracking passenger traffic in vehicles such as transit vehicles, counting the number of persons in a building in the event that a headcount is needed (e.g., to determine whether any persons are missing following a disaster or other emergency event, such as a tornado), or the like.

The monitoring system can include optical sensors, such as cameras, that can provide output used for security purposes. The output from the optical sensors can be stored responsive to a trigger event being detected, but otherwise discarded. For example, responsive to detecting the door contacting a person or object while closing, the monitoring system can save the optical sensor output from prior to this event to shortly after the event. As another example, the output from the optical sensor may be stored responsive to a fare collection device determining that a passenger has paid a fare (or passed through a gate of the fare collection device) without paying the fare. In another example, the output from the optical sensor can be stored responsive to a ramp or bridge plate of the vehicle being extended or retracted. The stored output from before the event, during the event, and/or after the event can be used for security, for liability investigations in case of an accident, or the like.

The monitoring system can include the sensors located above the door portal, and optionally mounted to other door components. The sensors can sense possible impedances to door movement. These impedances may include passengers, items carried by passengers, items propelled by passengers (e.g., carts, bikes, strollers, etc.), or items left in the path of the door travel. The monitoring system may detect the presence of these items in a vehicle doorway so that operation of the door may be modulated by the presence or absence of those items. For example, if a passenger is present such that a closing door will contact the passenger, that closing may be prevented or reversed to avoid that contact. The monitoring system may detect and respond without imparting contact on an obstruction.

The detection volume of the sensors can be based on the door size and geometry. This volume may include some of the area on one or both sides of the door (e.g., the passenger standing areas). As one example, the detection volume may range from up to twenty-one inches inside the door opening plane to twenty-one inches outside the door opening plane. Alternatively, the detection volume may be larger or smaller than these dimensions. The sensor of the monitoring system may be able to detect a target in the detection volume (which may be up to fifty-six inches by ninety-seven inches by thirty inches as one example, but alternatively may be a larger or smaller volume).

Figure 1:
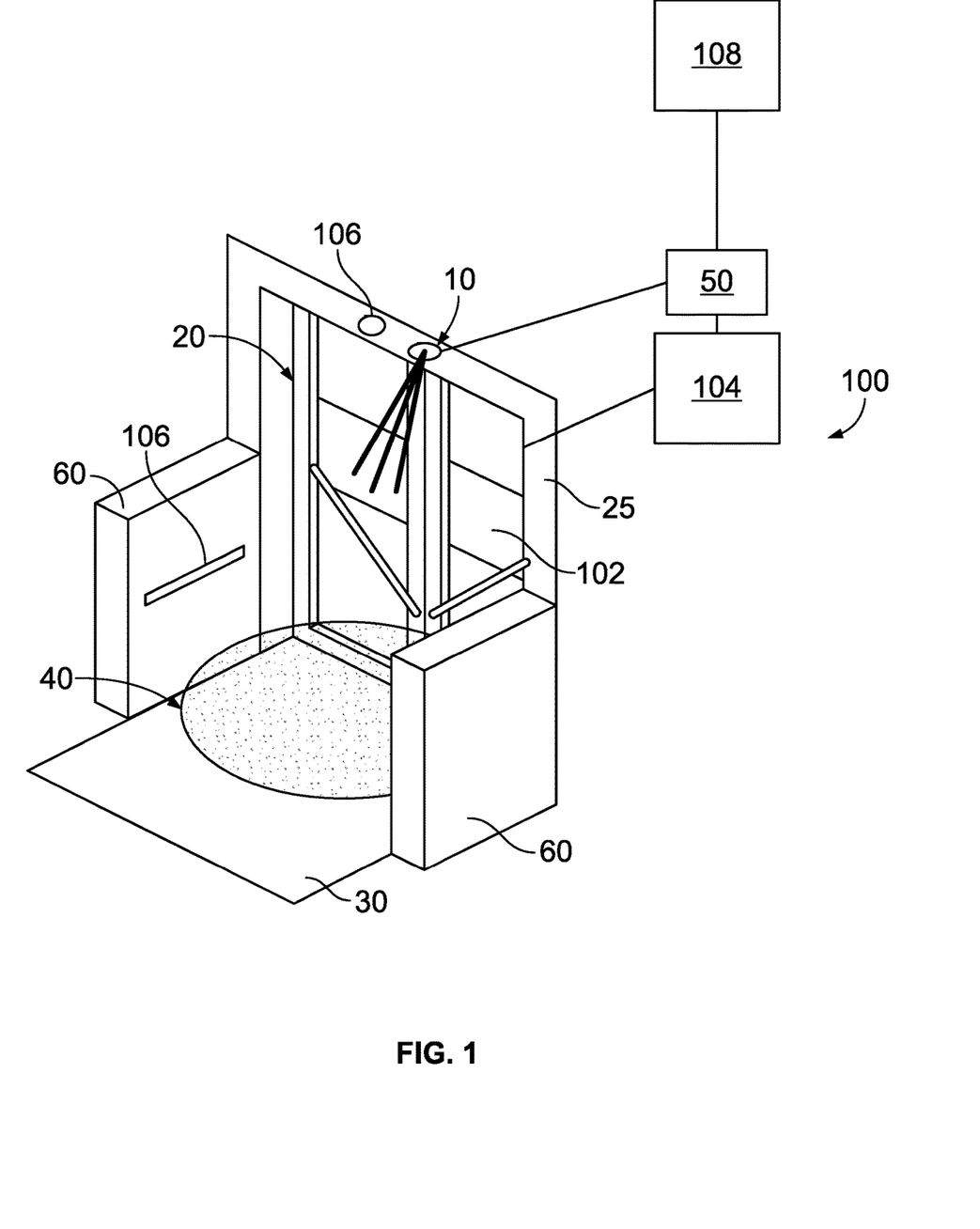
FIG. 1 illustrates one example of a door monitoring system and a hinged door that is monitored by the system.
Figure 2:
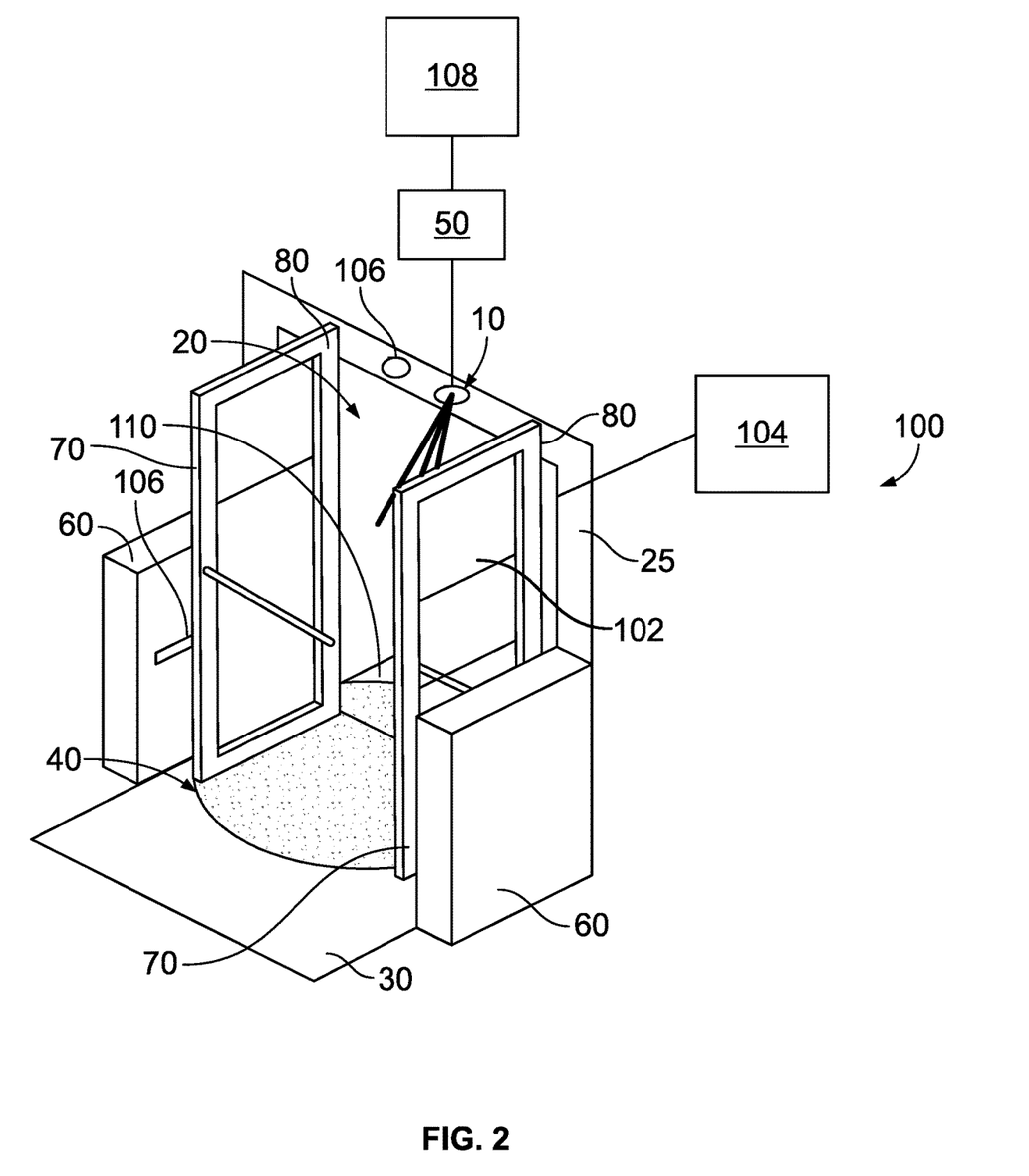
FIG. 2 illustrates another example of the door monitoring system and the hinged door shown in FIG. 1.
Figure 3:
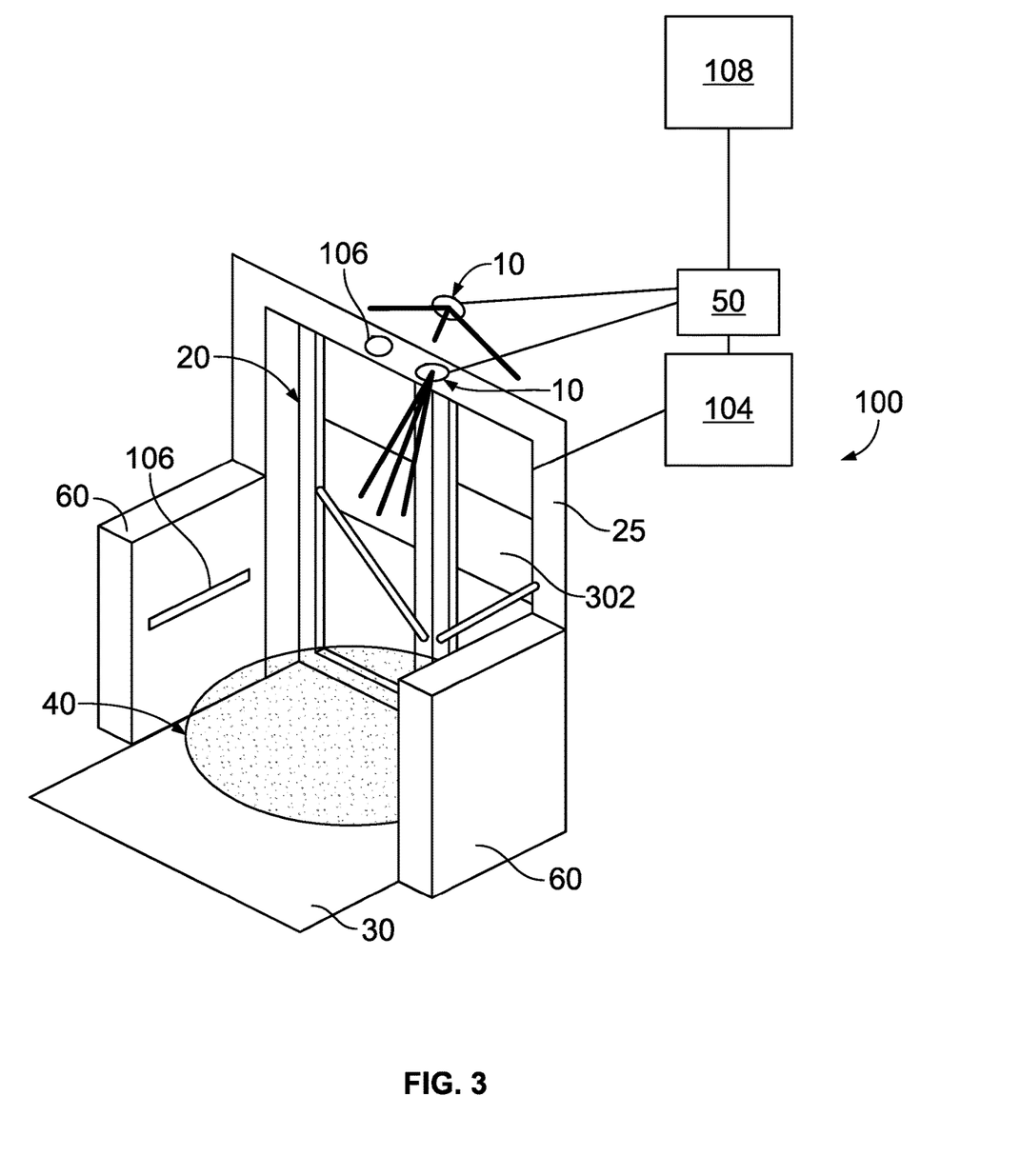
FIG. 3 illustrates one example of the door monitoring system and a sliding door that is monitored by the system.
Figure 4:
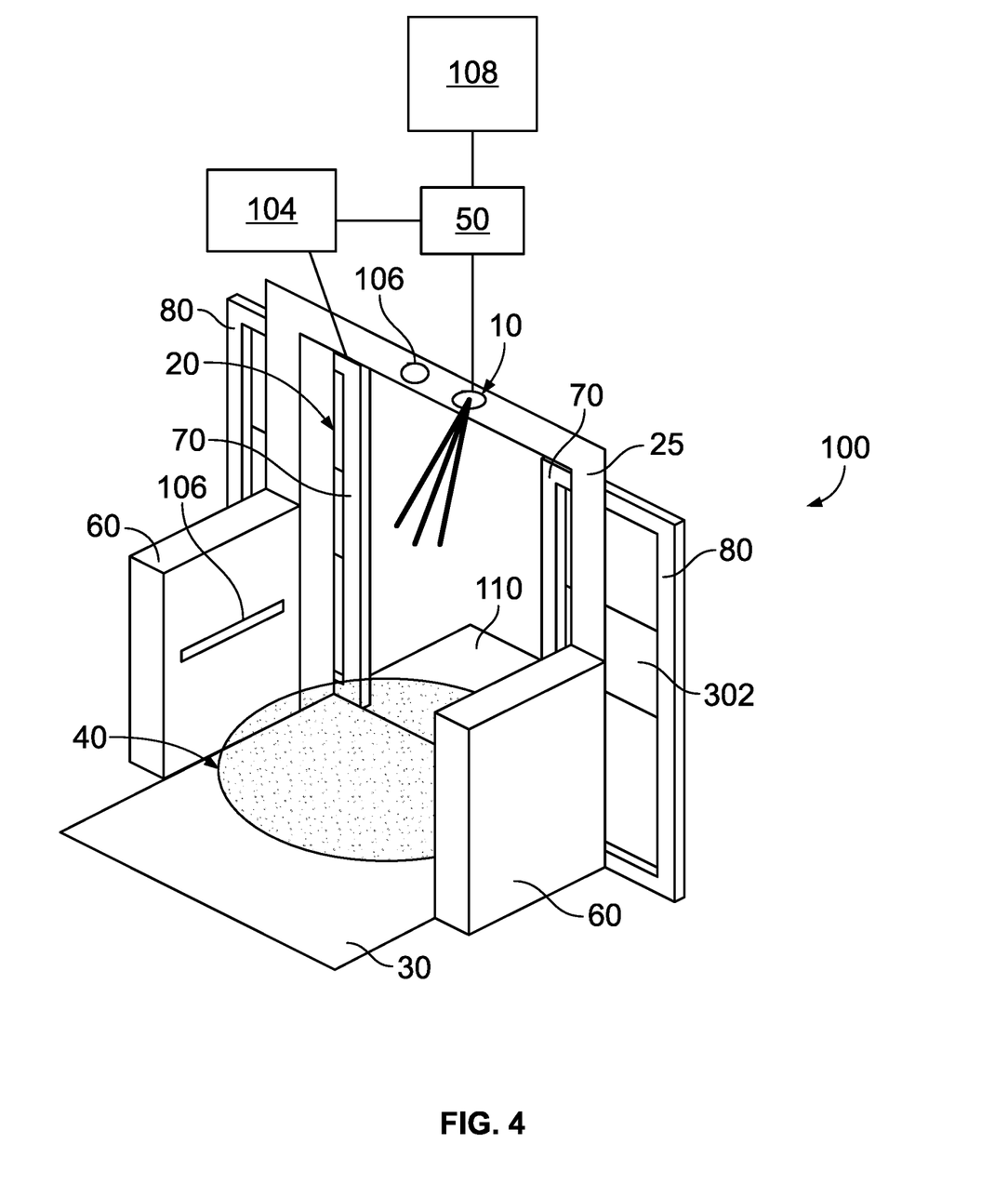
FIG. 4 illustrates another example of the door monitoring system and the sliding door shown in FIG. 3.

FIGS. 1 and 2 illustrate one example of a door monitoring system 100 and a hinged door 102 that is monitored by the system. FIGS. 3 and 4 illustrate another example of the system used in connection with a sliding door 302. The doors may open or close to permit or prevent passage of persons and/or objects through a door portal 20. The doors may automatically open and close (e.g., under control of one or more actuators 104, such as one or more motors). The doors are disposed in a door frame 25 and may include a pair of hinged doors (FIGS. 1 and 2) or sliding doors (FIGS. 3 and 4). FIGS. 1 and 3 show the doors in a closed state or position, while FIGS. 2 and 3 show the doors in an open state or position. Optionally, there may be a single door instead of multiple doors, the door or doors may be accordion doors (having multiple panes with hinges between the panes), or the like. The doors depicted in the Figures are provided merely as one example, and are not limiting on all embodiments of the inventive subject matter described herein.

Each door can include a leading edge 70 and a trailing edge 80, and the system can identify and track movement of the leading edge and/or and trailing edge of the doors during opening and/or closing the doors. The system can stop movement of the door responsive to determining that the leading edge or the trailing edge of the vehicle door will contact the one or more persons or objects if the door continues to move. For example, the system can include at least one sensor 10 that senses passengers, objects, and the like, within a monitoring area or range 40 of the sensor. Optionally, the sensor may monitor another part of the door. For example, the sensor may monitor movement of a panel of the door, a marker on the door (e.g., a piece of reflective tape, a painted or printed marker, etc.), or the like, to track movement of the door and prevent the door from striking a person or object.

The sensor can be a camera, as one example. The sensor may be disposed at the top of the door frame or otherwise above the door. Alternatively, the sensor may be disposed elsewhere, such as to one side of the door or in another location. The monitoring area or range may extend down to a floor 30 of the space inside of and/or outside of the doors. The system can include multiple ones of the sensor (or multiple different sensors) that can be redundantly employed such that one sensor can begin working upon the failure of one or more other sensors.

In one embodiment, the monitoring area can be defined by the size of the door and/or the geometry (e.g., shape) of the door. There can be multiple sensors, with each sensor disposed on a different side of the door frame. Each of these sensors can have a monitoring area on a different side of the door and door frame. Alternatively, a sensor may be oriented such that the monitoring area of the sensor can extend through the door portal and encompass both sides of the door when opened. The sensor or sensors may be disposed in any different position or positions that have field(s) of view of the door(s), around the door(s), outside of the door(s), inside the door(s), or the like. For example, the sensor(s) may be disposed above a door, across a door (e.g., on the opposite side of a door in the vehicle), on a side of the door, below a door, outside of a door, etc.

The monitoring area can extend from up to twenty-one inches inside the door opening plane to twenty-one inches outside the door opening plane. Alternatively, the monitoring area may be larger or smaller. The sensor(s) can be oriented and positioned to detect obstructions, persons, and/or other objects in a large space, such as a space up to fifty-six inches (extending in a direction away from the door portal), by ninety-seven inches (up from the floor), by thirty inches wide (extending in a lateral direction), or another size.

The sensor may sense possible impedances to door movement. These may include passengers, items carried by passengers, items propelled by passengers (carts, bikes, or strollers, etc.), or items left in the path of the door travel. The sensor can detect the presence of these items in the doorway or door portal so that operation (e.g., movement) of the door may be controlled based on the presence or absence of those items. For example, the system can include a controller 50 that controls operation of one or more actuators or motors that move the door between open and closed states. The controller can represent hardware circuitry that includes and/or is connected with one or more processors (e.g., integrated circuits, field programmable gate arrays, integrated circuits, etc.) that operate as described herein in connection with the controller. The controller can receive output from the sensor to determine whether to open or close, or stop opening or closing, of the door. For example, if the output from the sensor indicates that a passenger or object is present such that a closing door will contact the passenger or object, then the controller can direct the actuator(s) to stop closing of the door and/or to reverse movement of the door.

The sensor and/or controller can differentiate between persistent objects 60 and intermittent objects or persons. A persistent object can be an object that remains present or stationary, and may be within the monitored area of the sensor and system. An intermittent object can be an object or person that does not remain present or stationary, and instead moves relative to the door such that the intermittent object is not always present within the monitored area or field of view of the sensor(s). Examples of persistent objects include handrails, modesty guards, support elements, or the like. The controller can be programmed or learn (e.g., using artificial intelligence or machine learning) differences between persistent and intermittent objects. The controller can categorize different types of objects detected by the sensor(s) to learn different types of obstructions based on the environment of the system and the event to which the system is exposed. For example, over time, the controller can learn (or be programmed) to distinguish between an irrelevant obstruction such as papers, leaves, precipitation outside of the door, etc., and a relevant obstruction such as a person, stroller, or the like. The controller may not change or stop movement of the door responsive to detecting an irrelevant obstruction, but may stop or change the direction of movement of the door responsive to detecting a relevant obstruction.

The controller optionally can be programmed or learn to identify a passenger gesture to change a state or direction of movement of the door. For example, the sensor can detect, and the controller can interpret detection (by the sensor) of a waving hand, a raised hand, or other predefined or designated movement by a person as an indication to change movement of the door. This change in movement can be opening the door, closing the door, stopping current movement of the door, or slowing current movement of the door. The controller can direct the actuator(s) to change the movement of the door or authorize movement of the door, as indicated by the gesture. This can reduce the instances in which passengers are required to touch surfaces in or around the door.

The controller can change the monitored area by modifying one or more characteristics of the sensors, such as a focal length, orientation, etc. Optionally, the controller can receive data output from the sensor(s) for the larger monitored area but examine a smaller portion or fraction of the monitored area. As one example, the controller can examine a smaller portion of the monitored area that includes or is in front of a designated area. This designated area can include a button, sign, or the like, where movement of a person, the presence of a hand of the person, or the like, is detected by the controller. Responsive to detecting the person in the smaller portion of the monitored area, the controller can control the actuators to open the door.

For example, the controller can examine the sensor data representative of movement or the presence of a person/object within a small, narrow rectangle zone located along the inside of the doors. Detection of a person in this zone may indicate a request to open the door. If the controller determines that the door is already closed (e.g., by monitoring the sensor output) and that the door is authorized to be opened (e.g., based on whether the vehicle is moving and/or operator input), then the controller can automatically control the actuator(s) to open the door.

The controller can examine the sensor output and determine whether to prevent or authorize movement of the door. The preceding example relates to controlling a movement of the door based on a gesture, the controller optionally can permit or prevent the door from being opened (by controlling the actuator(s) and/or lock(s)) based on detection of a person or object within the monitored area or range of the sensor(s). If the controller determines that a person is within the monitored area, the controller may control the actuator(s) to allow the door to be opened. For example, the controller may direct the motors to no longer prevent the door from being opened to allow a person to manually open the door. If no person is detected within the monitored area, the controller may control the actuator(s) to prevent the door from being opened.

In one embodiment, the controller may direct the actuator to open, close, permit opening, or prevent opening of the door responsive to a person being detected by the sensor(s), the date, and/or the time of day. The controller may base the decision on whether to open, close, permit opening, or prevent opening of the door based on time due to certain periods of time being associated with increased likelihoods of persons being intoxicated or sleeping near the door. For example, if the controller detects a person near the door (within the monitored area), the day is on a weekend (or another date, such as a holiday, associated with increased consumption of intoxicants), and/or the time is late at night or early in the morning, the controller may prevent the door from opening. This can prevent a person that is intoxicated or sleeping near the door from falling out of the vehicle (while the vehicle is moving or stationary) if the door were to open.

The controller can change or control a speed at which the door moves based on the sensor(s) detecting the presence or absence of a person. If the controller determines that a person is within the monitored area, the controller may slow down or restrict the speed at which the door moves in a closing direction (to close the door) or speed up or allow faster speeds at which the door moves in an opening direction (to open the door). Conversely, if the controller determines that a person is not within the monitored area, the controller may close the door at faster speeds (relative to when a person is detected) or open the door at slower speeds (relative to when a person is detected). This can help reduce the likelihood of a person being struck by the closing door or colliding with a slower moving door that is opening.

The controller optionally can change or control a speed at which the door moves based on the sensor(s) detecting movement of a person. If the controller determines that a person is moving toward the door that is open but closing, the controller may slow down the speed at which the door was moving (e.g., until the person moves through the door portal and is clear of the door). If the controller determines that a person is moving toward the door that is opening (but not fully open), the controller may increase the speed at which the door was moving (e.g., to ensure the door is open when the person reaches the door).

The controller can determine whether an object is resting, abutting, or otherwise contacting the door based on the sensor output. The controller can then prevent the door from being opened until the object is no longer leaning against or abutting the door. This can prevent the object from falling out of the door if the door were to be opened.

Changes in lighting conditions (e.g., the ambient light) within the monitored area can negatively impact the ability of the sensor(s) to detect objects or persons in the monitored area and/or the ability of the controller to identify the objects or persons in the sensor output. For example, very low or dim light may make the objects, persons, gestures, etc. difficult to detect or identify. The system can include one or more lamps 106 that are controlled by the controller to generate light. The lamps can represent incandescent lights, light emitting diodes, or other devices that generate light. The lamps can be disposed above the door, to the side of the door, on or in the door, on or in the floor, etc. The controller can direct the lamps to activate and generate light responsive to the controller being unable to detect persons or objects in the sensor output and/or the sensor(s) being unable to detect one or more persons or objects within a threshold period of time. For example, if there normally are persons and/or objects within the monitored area but none have been detected for an extended period of time, the controller may determine that there is insufficient light and activate the lamp(s).

Optionally, the lamp(s) can generate light or change the color of the light that is generated to notify passengers of a state of the door. For example, the controller can direct the lamp(s) to generate a green light to indicate that the door is unlocked, permitted to be opened, or is open. The controller can direct the lamp(s) to generate a yellow light to indicate that the door is opening or permitted to be opened (but not yet open). The controller can direct the lamp(s) to generate a red light to indicate that the door is closed, locked, or otherwise not permitted to be opened.

The controller may communicate with an output device 108 to communicate information with an operator of the vehicle, security of a building, or the like. For example, the controller can send a warning or notification via a flashing light, alphanumeric message, audible alarm, or the like, to a driver of the vehicle. The warning or notification can be sent responsive to detecting the presence of a person or object outside of the door. As described above, the monitored area or field of view of the sensor(s) may extend outside of the door (e.g., outside of the vehicle or building). The controller can send a warning to the operator of the vehicle responsive to detecting the presence of a person outside of the door. Optionally, the output device shown in the Figures can represent a vehicle control unit that controls operation of the vehicle. The vehicle control unit can represent hardware circuitry that includes and/or is connected with one or more processors that can control operation of the vehicle. The controller can send a signal to the vehicle control unit to prevent the vehicle from moving responsive to detecting the presence of a person outside of the door. This can prevent the vehicle from moving and potentially striking the person that is nearby, but outside of, the vehicle. Optionally, instead of preventing movement of the vehicle, the control unit can restrict the speed and/or direction in which the vehicle moves responsive to detecting a presence of a person outside the door.

The vehicle may include a deployable passenger device 110 that can be controlled by the same or different actuators that control movement of the door. The deployable passenger device can represent a ramp, bridge plate, stairs, lift, or a platform that can extend from the vehicle in one state and retract back into or toward the vehicle in another state. In the extended state, the passenger device can provide a surface for passengers to walk on while exiting or entering the vehicle through the door. The passenger device may need to retract to avoid colliding with persons or objects while the vehicle is moving. In one embodiment, the controller can direct the actuators to retract the passenger device responsive to the sensor output indicating that a person is outside of the door. This can prevent persons from being struck by the passenger device or trapped between the passenger device and a platform or other surface outside of the vehicle.

Optionally, the controller can examine the sensor data to determine whether there is a person or object on the passenger device. The controller may not move the passenger device if a person or object is detected on the passenger device. For example, if a person or object is detected on a deployed ramp, plate, or stairs, the controller can prevent the actuator(s) from retracting the ramp, plate, or stairs to prevent a person or object from falling off the ramp, plate, or stairs.

The controller can track how many people and/or objects are onboard the vehicle or inside the building via the door based on the sensor output. The controller can monitor the sensor output to count the number of persons entering into the vehicle or building, and/or exiting the vehicle or building via the door portal. This information can be used to determine how many people are onboard the vehicle or in the building over time (or at different times). This information can be used to calculate whether additional vehicles need to be scheduled to travel along certain routes (due to overcrowding on the vehicle), whether any persons remain in a building (e.g., after an emergency event where a head count is needed, etc.). In one example, the controller may only count the number of passengers and/or objects entering and/or exiting the vehicle (or building) while the door is open. This can help prevent mis-counting the number of persons or objects onboard the vehicle or inside the building.

The controller can examine the sensor output to monitor a health state of the door. The health state of the door can indicate whether the door is operating as expected, or whether the door is operating in an unexpected or undesirable manner. For example, the controller can monitor the speed and/or paths of movement of the leading and/or trailing edges of the doors to determine whether the speed and/or paths are within designated acceptable ranges. If a door is moving faster or slower than a designated range of speeds and/or a leading or trailing edge of the door is moving outside of a designated area or volume, then the controller can determine that the door has a health state that may require inspection and/or maintenance. As another example, if the door is moving (e.g., opening or closing) while the door is supposed to be open or closed, then the controller can determine that the door has a health state that may require inspection and/or maintenance. The controller optionally can change how the door is opened responsive to determining that the door is in this state. For example, the controller can control the actuator and/or lock to prevent the door from opening, can send a signal to the vehicle or operator of the vehicle to stop the vehicle, or the like.

Optionally, the controller can monitor the operation, state, and/or health of components, persons, and/or objects in addition to or as alternates to the door. For example, the field of view of the sensor(s) can capture operation of a lift, ramp, or the like, that is used to assist passengers boarding and/or disembarking from the vehicle. The controller can monitor output from the sensor(s) to determine whether the state of the lift, ramp, or other component is acceptable for the vehicle to begin movement. For example, if the sensor output indicates that a ramp or lift is deployed, the controller may notify an operator of the vehicle to refrain from moving the vehicle and/or may automatically stop movement of the vehicle. As another example, if the sensor output indicates that a ramp or lift is deployed and a passenger is on or near (e.g., within a threshold distance) of the ramp or lift, the controller may notify an operator of the vehicle to refrain from moving the vehicle and/or may automatically stop movement of the vehicle. As another example, if the sensor output indicates that a wheelchair has wheel(s) on the deployed ramp or lift, the controller may notify an operator of the vehicle to refrain from moving the vehicle and/or may automatically stop movement of the vehicle.

The sensor may have a field of view that is outside the vehicle to assist the operator of the vehicle in identifying the presence of persons or objects outside the vehicle but in a position or location at risk for being struck by the vehicle. For example, the sensor may have a field of view that encompasses an area or volume of the front right side of the vehicle. During right turns of the vehicle, the operator (e.g., driver) may have reduced visibility in this area or volume. The controller may monitor the sensor output to identify the presence of person(s) and/or object(s) within this area. If a person and/or object is identified in this area or volume, the controller may notify an operator of the vehicle to refrain from moving the vehicle and/or may automatically stop movement of the vehicle.

Figure 5:
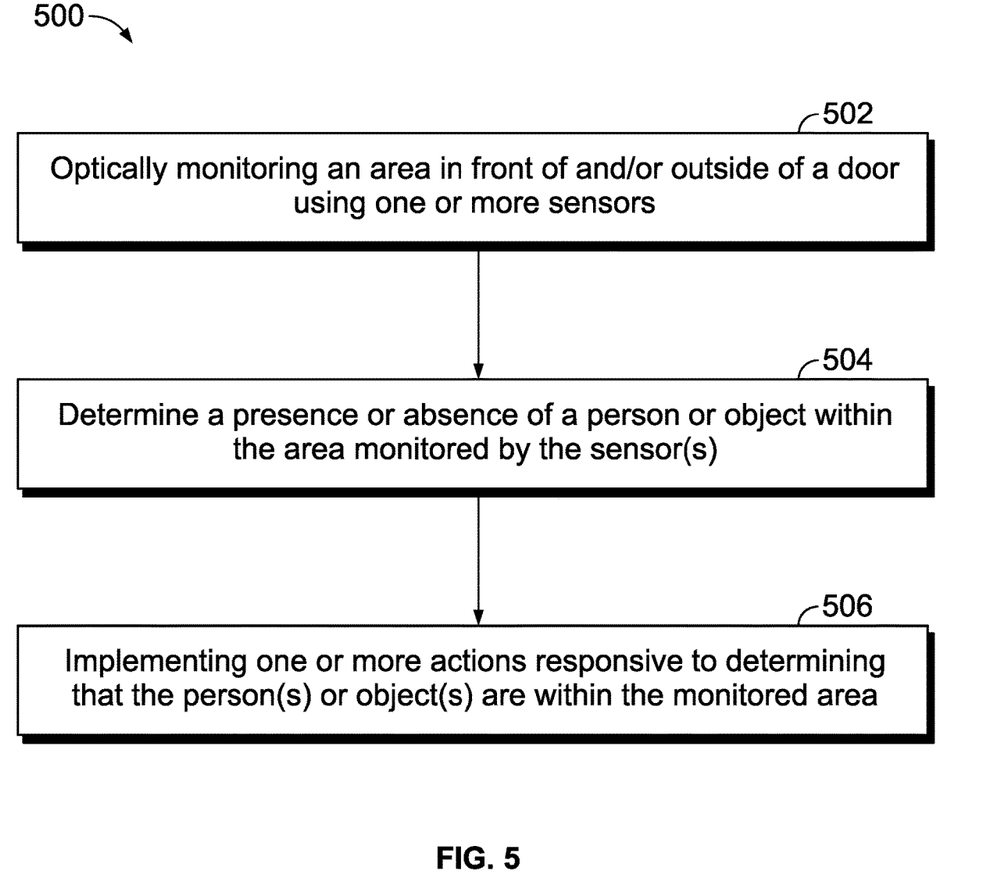
FIG. 5 illustrates a flowchart of one example of a method for controlling operation of a door based on a monitored area near the door.

FIG. 5 illustrates a flowchart of one example of a method 500 for controlling operation of a door based on a monitored area near the door. The method can represent operations performed by the monitoring system. At step 502, an area in front of and/or behind a door is optically monitored using one or more sensors. This area can be defined by a field of view of optical sensor(s) that includes at least part of an interior vehicle floor in front of the door. At step 504, a presence or absence of the one or more persons or objects within the field of view of the sensor(s) is determined. This determination may be completed using the data that is output by the sensor(s). At step 506, one or more actions are implemented responsive to detecting the presence or absence of a person or object. As one example, the door may be authorized (e.g., allowed) to open or may be opened when a person or object is detected, and/or when a passenger gesture is detected. As another example, the door may be prevented from opening. In another example, a speed at which the door moves may be changed. The door may be prevented from being opened based on detecting the presence of the one or more persons or objects abutting the door.

In one embodiment, the system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In one embodiment, a system (e.g., a monitoring system, such as a vehicle monitoring system or a door monitoring system) includes an optical sensor that may generate sensor signals indicative of a field of view of the optical sensor. The field of view may include at least part of an interior vehicle floor in front of a vehicle door. The system also may include controller that receives the sensor signals and that detects a presence or absence of one or more persons and/or objects within the field of view of the optical sensor. The controller may change a speed at which the vehicle door moves based on the presence or the absence of the persons and/or objects that are detected responsive to detecting the presence or absence of the persons and/or objects.

The controller may identify a passenger gesture to open the vehicle door from the sensor signals. Responsive to identifying the passenger gesture, the controller may authorize the vehicle door to open. For example, the controller may release or open a lock, allow a motor to operate to move or allow the door to move, etc. The controller may prevent the vehicle door from automatically opening based on detecting the absence of the persons and/or objects. The controller may prevent the vehicle door from automatically opening based on detecting the presence of the persons and/or objects abutting the vehicle door.

The controller may identify one or more persistent environmental objects within the field of view of the optical sensor. The controller may discriminate the one or more persons or objects from the one or more persistent environmental objects based on the one or more persistent environmental objects that are identified. For example, the persistent objects may be identified by operator input to the controller. The controller can use this input to determine what areas of the images output by the optical sensor (e.g., a camera) are the persistent objects. Optionally, the controller can learn the persistent objects using machine learning or artificial intelligence. For example, the controller can identify what objects appear in the sensor output in the same locations over extended periods of time. These objects can then be identified by the controller as the persistent objects.

The vehicle door may have opposite leading and trailing edges, panels, markings, or the like. The controller may identify, from the sensor signals, movement of one or more of these items of the door during opening and/or closing of the vehicle door. The controller may change movement of the door responsive to determining that the vehicle door will contact the persons and/or objects if the vehicle door continues to move. The controller may learn different appearances of one or more persistent environmental objects or the one or more persons or objects under different lighting conditions. For example, the controller may be programmed or determine (e.g., via machine learning or artificial intelligence) the appearance of the persistent objects in different lighting conditions. The controller can be trained with this information and later use this information to identify and discriminate persons from persistent objects in the field of view of the optical sensor under different lighting conditions. The controller may determine a current lighting condition and change the speed at which the vehicle door moves based on the presence or the absence of the persons and/or objects that are detected and based on the different appearances associated with the different lighting conditions. The controller may determine a current lighting condition and control the optical sensor and/or a lamp to change the current lighting condition. This can change the appearance of the one or more persistent environmental objects or the persons and/or objects.

The field of view of the optical sensor may extend outside of a vehicle. For example, the camera may be oriented so that the field of view extends through the door, through a window, etc. The optical sensor may be an interior optical sensor disposed inside a vehicle having the vehicle door. The field of view of the interior optical sensor may be a first field of view. The system also may include an exterior optical sensor disposed outside of the vehicle and the vehicle door. The exterior optical sensor may generate second sensor signals indicative of a sensed presence or absence of the persons and/or objects within a second field of view of the exterior optical sensor.

The controller may identify the presence of the persons and/or objects outside of the vehicle based on the second sensor signals from the exterior optical sensor. The controller may generate a warning to a control system or driver of the vehicle to indicate the presence of the persons and/or objects outside of the vehicle. The controller may automatically change or restrict movement of the vehicle based on the presence of the one or more persons or objects outside of the vehicle that is identified. For example, the controller may brake the vehicle, change a steering or heading of the vehicle, or the like, to prevent a collision with a person or object identified from the sensor output.

The controller may automatically control movement of a ramp, bridge plate, lift, and/or moveable steps outside of the vehicle and the vehicle door responsive to identifying the persons and/or objects outside of the vehicle and/or inside the vehicle. The controller may count a number of passengers entering and/or exiting the vehicle based on the sensor signals from the optical sensor. The sensor signals may be obtained from the interior optical sensor (if the optical sensor is the interior optical sensor), and/or the second sensor signals from the exterior optical sensor. The controller may identify an operational condition of the vehicle door, another door of the vehicle, a ramp of the vehicle, and/or a lift of the vehicle based on the sensor signals from the optical sensor.

In another example, a method is provided that may include generating sensor signals indicative of a sensed presence or absence of one or more persons or objects within a field of view of an optical sensor. The field of view may include at least part of an interior vehicle floor in front of a vehicle door. The method also may include detecting the presence or absence of the one or more persons or objects within the field of view based on the sensor signals, and changing a speed at which the vehicle door moves responsive to detecting the presence or the absence of the one or more persons or objects.

The method also may include identifying, based on the sensor signals, a passenger gesture to open the vehicle door, and, responsive to the identifying, authorizing the vehicle door to open. The method also may include preventing the vehicle door from automatically opening based on detecting the absence of the one or more persons or objects.

The method may include preventing the vehicle door from automatically opening based on detecting the presence of the one or more persons or objects abutting the vehicle door. The method may include determining (with a controller) one or more persistent environmental objects within the field of view of the optical sensor based on one or more of operator input or machine learning, and discriminating the one or more persons or objects from the one or more persistent environmental objects using the controller and based on the determining.

The method also may include monitoring movement of the vehicle door during opening or closing of the vehicle door, and changing movement of the vehicle door based on the movement of the vehicle door that is monitored. The method also may include teaching a controller of different appearances of one or more persistent environmental objects or the one or more persons or objects under different lighting conditions.

The method may include determining a current lighting condition, and one or more of identifying the passenger gesture, preventing the vehicle door from automatically opening, or increasing the speed at which the vehicle door is closed based on the current lighting condition and the different appearances associated with the different lighting conditions. The method may include determining a current lighting condition, and controlling one or more of the optical sensor or a lamp to change the current lighting condition and to change the appearance of the one or more persistent environmental objects or the one or more persons or objects.

The field of view of the optical sensor may extend outside of a vehicle through one or more of a window of the vehicle door or a doorway of the vehicle door. The optical sensor may be an interior optical sensor disposed inside a vehicle having the vehicle door. The field of view of the interior optical sensor may be a first field of view, and an exterior optical sensor may be disposed outside of the vehicle and the vehicle door. The exterior optical sensor may detect the one or more persons or objects within a second field of view of the exterior optical sensor.

The method also may include identifying a presence of one or more persons or objects outside of the vehicle based on the sensor signals from the optical sensor, and generating a warning to a control system or driver of the vehicle to indicate the presence of the one or more persons or objects outside of the vehicle. The method may include automatically changing or restricting movement of the vehicle based on the presence of the one or more persons or objects outside of the vehicle that is identified.

The method may include automatically preventing deployment of a ramp, bridge plate, or moveable steps outside of the vehicle and the vehicle door responsive to one or more of identifying the one or more persons or objects outside of the vehicle or inside the vehicle. The method may include counting a number of passengers one or more of entering or exiting the vehicle based on the sensor signals. The method may include identifying an operational condition of the vehicle door based on the sensor signals.

In another example, a monitoring system may include an optical sensor that may generate sensor signals of a sensed field of view of the optical sensor. The system also may include a controller that receives the sensor signals from the optical sensor and one or more of (a) prevents a vehicle door from automatically opening or speed up closing of the vehicle door based on detecting an absence of one or more persons or objects within the field of view and/or (b) prevents the vehicle door from automatically opening based on detecting the presence of the one or more persons or objects abutting the vehicle door. The field of view may include at least part of a vehicle interior in front of the vehicle door. The field of view may include at least part of a vehicle exterior outside of the vehicle door. The field of view may include at least part of a vehicle exterior outside of the vehicle door and at least part of a vehicle interior in front of the vehicle door.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

A reference herein to a patent document or any other matter identified as prior art, is not to be taken as an admission that the document or other matter was known or that the information it contains was part of the common general knowledge as at the priority date of any of the claims.

What is claimed is:

1. A system, comprising:
   an optical sensor configured to generate sensor signals indicative of a field of view of the optical sensor, the field of view including at least part of an interior vehicle floor in front of a vehicle door; and
   a controller configured to communicate with the optical sensor, wherein the controller is further configured to:
      receive the sensor signals from the optical sensor;
      detect, from the sensor signals, a presence or absence of one or more intermittent objects within the field of view of the optical sensor, wherein the one or more intermittent objects include one or more persons or objects not always present within the field of view of the optical sensor;
      detect, from the sensor signals, a presence or absence of one or more persistent objects within the field of view of the optical sensor, wherein the one or more persistent objects include one or more persons or objects that remain present and stationary within the field of view of the optical sensor for a determined period of time;
      differentiate the one or more intermittent objects from the one or more persistent objects that are always present within the field of view of the optical sensor; and
      change a speed at which the vehicle door moves based on the presence or the absence of the one or more intermittent objects that is detected responsive to detecting the presence or the absence of the one or more intermittent objects.

2. The system of claim 1, wherein the controller is configured to:
   identify, from the sensor signals, a passenger gesture to change a movement of the vehicle door; and
   authorize the vehicle door to change the movement based on the passenger gesture.

3. The system of claim 1, wherein the controller is configured to prevent the vehicle door from automatically opening based on detecting the absence of the one or more intermittent objects.

4. The system of claim 1, wherein the controller is configured to prevent the vehicle door from automatically opening based on detecting the presence of the one or more intermittent objects abutting the vehicle door.

5. The system of claim 1, wherein the vehicle door comprises a leading edge opposite to a trailing edges, and the controller is configured to:
   identify, from the sensor signals, movement of the leading edge and the trailing edge of the vehicle door during one or more of opening or closing the vehicle door; and
   change the movement of the vehicle door responsive to determining that the leading edge or the trailing edge of the vehicle door will contact the one or more intermittent objects if the vehicle door continues to move.

6. The system of claim 1, wherein the controller is configured to learn different appearances under different lighting conditions of:
   the one or more persistent objects; or
   the one or more intermittent objects.

7. The system of claim 6, wherein the controller is configured to:
   determine a current lighting condition; and
   change the speed at which the vehicle door moves based on the presence or the absence of the one or more intermittent objects that is detected and based on the different appearances associated with the different lighting conditions.

8. The system of claim 6, wherein the controller is configured to:
   determine a current lighting condition;
   control one or more of the optical sensor or a lamp to change the current lighting condition; and
   change the appearance of the one or more persistent objects or the one or more intermittent objects.

9. The system of claim 1, wherein the field of view of the optical sensor extends outside of a vehicle.

10. The system of claim 1, wherein the optical sensor is an interior optical sensor disposed inside a vehicle having the vehicle door, the field of view of the interior optical sensor is a first field of view, and further comprising:
    an exterior optical sensor configured to be disposed outside of the vehicle and the vehicle door, the exterior optical sensor configured to generate second sensor signals indicative of a sensed presence or absence of the one or more intermittent objects within a second field of view of the exterior optical sensor.

11. The system of claim 10, wherein the controller is configured to:
    identify the presence of the one or more intermittent objects outside of the vehicle based on the second sensor signals from the exterior optical sensor; and
    generate a warning to a control system or driver of the vehicle to indicate the presence of the one or more intermittent objects outside of the vehicle.

12. The system of claim 11, wherein the controller is configured to automatically change or restrict movement of the vehicle based on the presence of the one or more intermittent objects outside of the vehicle that is identified.

13. A method, comprising: generating sensor signals indicative of a sensed presence or absence of one or more intermittent objects and one or more persistent objects within a field of view of an optical sensor, the field of view including at least part of an interior vehicle floor in front of a vehicle door; detecting, based on the sensor signals, the sensed presence or absence of the one or more intermittent objects within the field of view of the optical sensor, wherein the one or more intermittent objects include one or more persons or objects not always present within the field of view of the optical sensor; detecting, based on the sensor signals, the sensed presence or absence of the one or more persistent objects within the field of view of the optical sensor, wherein the one or more persistent objects include one or more persons or objects that are always present within the field of view of the optical sensor for a determined period of time; differentiating the one or more intermittent objects from the one or more persistent objects within the field of view of the optical sensor; and changing a speed at which the vehicle door moves responsive to detecting the presence or the absence of the one or more intermittent objects.

14. The method of claim 13, further comprising identifying, based on the sensor signals, a passenger gesture to change a movement of the vehicle door, and, responsive to the identifying, authorizing the vehicle door to change the movement.

15. The method of claim 13, further comprising preventing the vehicle door from automatically opening based on detecting the absence of the one or more intermittent objects.

16. A system, comprising:
an optical sensor configured to generate sensor signals of a sensed field of view of the optical sensor; and
a controller configured to communicate with the optical sensor, the controller is further configured to:
receive the sensor signals from the optical sensor;
detect, from the sensor signals, a presence or absence of one or more intermittent objects within the field of view of the optical sensor, wherein the one or more intermittent objects include one or more persons or objects not always present within the field of view of the optical sensor;
detect, from the sensor signals, a presence or absence of one or more persistent objects within the field of view of the optical sensor, wherein the one or more persistent objects include one or more persons or objects that remain present and stationary within the field of view of the optical sensor for a determined period of time;
differentiate the one or more intermittent objects from the one or more persistent objects that are always present within the field of view of the optical sensor; and
prevent a vehicle door from, one or more of: automatically opening or speed up closing of the vehicle door based on the absence of the one or more intermittent objects within the field of view, automatically opening based on the presence of the one or more intermittent objects abutting the vehicle door, or a combination thereof.

17. The system of claim 16, wherein the field of view includes at least part of a vehicle interior in front of the vehicle door.

18. The system of claim 16, wherein the field of view includes at least part of a vehicle exterior outside of the vehicle door.

19. The system of claim 16, wherein the field of view includes at least part of a vehicle exterior outside of the vehicle door and at least part of a vehicle interior in front of the vehicle door.

* * * * *